United States Patent
Yagi et al.

(10) Patent No.: US 12,398,773 B2
(45) Date of Patent: Aug. 26, 2025

(54) METHOD FOR MANUFACTURING WET FRICTION PLATE

(71) Applicant: Kabushiki Kaisha F.C.C., Shizuoka (JP)

(72) Inventors: Shintaro Yagi, Shizuoka (JP); Katsumasa Kiuchi, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 176 days.

(21) Appl. No.: 17/923,512

(22) PCT Filed: Apr. 22, 2021

(86) PCT No.: PCT/JP2021/016346
§ 371 (c)(1),
(2) Date: Nov. 4, 2022

(87) PCT Pub. No.: WO2021/241090
PCT Pub. Date: Dec. 2, 2021

(65) Prior Publication Data
US 2023/0193971 A1  Jun. 22, 2023

(30) Foreign Application Priority Data
May 29, 2020  (JP) .............................. 2020-094084

(51) Int. Cl.
*F16D 69/04*  (2006.01)
*B23K 26/364*  (2014.01)
(Continued)

(52) U.S. Cl.
CPC ........ *F16D 69/0408* (2013.01); *B23K 26/364* (2015.10); *F16D 69/026* (2013.01);
(Continued)

(58) Field of Classification Search
CPC .................. F16D 2069/004; F16D 2200/0086
See application file for complete search history.

(56) References Cited

U.S. PATENT DOCUMENTS

| | | | | |
|---|---|---|---|---|
| 2002/0127379 A1* | 9/2002 | Suzuki | ................ | H05K 1/0366 |
| | | | | 428/209 |
| 2007/0270069 A1* | 11/2007 | Lee | ......................... | F16D 69/02 |
| | | | | 66/190 |

(Continued)

FOREIGN PATENT DOCUMENTS

| JP | 11-247904 A | 9/1999 |
|---|---|---|
| JP | 2010-48272 A | 3/2010 |

(Continued)

OTHER PUBLICATIONS

International Search Report (ISR) dated mailed Jul. 13, 2021 filed in PCT/JP2021/016346.

*Primary Examiner* — Alex A Rolland
(74) *Attorney, Agent, or Firm* — RANKIN, HILL & CLARK LLP

(57) ABSTRACT

There is provided a method for producing a wet friction plate that can improve the retention property of lubricating oils in a fine groove formed by laser light. In a method for producing a wet friction plate (200), a friction material (210) is produced by sheet making processing in a first step. Thereafter, in a second step, a fine groove (211) is formed on the friction material (210). The friction material (210) is produced such that thermosetting resin therein is in a semi-cured state. The cross-sectional shape of the fine groove (211) is formed into a V shape by laser light. Subsequently, in a third step, the friction material (210) is disposed on a core metal (201) via an adhesive agent including thermosetting resin. Subsequently, in a fourth step, the friction material (210) is pressed while heated to crush the fine groove (211). In this manner, unevenness is formed on an (Continued)

intra-groove surface (212), and the thermosetting resin is completely cured.

7 Claims, 6 Drawing Sheets

(51) Int. Cl.
*F16D 13/64* (2006.01)
*F16D 13/72* (2006.01)
*F16D 13/74* (2006.01)
*F16D 69/00* (2006.01)
*F16D 69/02* (2006.01)

(52) U.S. Cl.
CPC ............ *F16D 13/648* (2013.01); *F16D 13/72* (2013.01); *F16D 13/74* (2013.01); *F16D 2069/004* (2013.01); *F16D 2069/0483* (2013.01)

(56) References Cited

U.S. PATENT DOCUMENTS

| | | |
|---|---|---|
| 2010/0044182 A1 | 2/2010 | Sakabe et al. |
| 2013/0168199 A1 | 7/2013 | Higashijima et al. |
| 2019/0193207 A1* | 6/2019 | Kremer ................ F16D 65/127 |

FOREIGN PATENT DOCUMENTS

| | | |
|---|---|---|
| JP | 2014-133242 A | 7/2014 |
| WO | 2011/118347 A1 | 9/2011 |

\* cited by examiner

METHOD FOR MANUFACTURING WET FRICTION PLATE

TECHNICAL FIELD

The present invention relates to a method for producing a wet friction plate used in lubricating oil.

BACKGROUND ART

A wet multiple disc clutch device has been mounted on vehicles such as four- or two-wheeled motor vehicles in order to transmit or interrupt rotary driving force of a motor such as an engine to a driven body such as a wheel. In the wet multiple disc clutch device, two plates facing each other in lubricating oil are generally pushed against each other so that rotary driving force is transmitted or interrupted.

Of these two plates, one is configured with a flat-plate ring-shaped wet friction plate which includes friction materials disposed along the circumferential direction on the surface of a core metal. For example, Patent Literature 1 described below discloses a laser processing method and a laser processing device of a friction plate (hereinafter, referred to as a "wet friction plate"), which form a concave portion (hereinafter, referred to as a "fine groove") including a minute uneven portion or groove on the surface of a friction plate by laser light. This allows the wet friction plate to have a processed end in the fine groove sharpened by laser light. This can promote the circulation of lubricating oil in the fine groove, compared to a known cutting process.

CITATION LIST

Patent Literature

Patent Literature 1: JP-A-2014-133242

In the laser processing method and the laser processing device of a wet friction plate described in Patent Literature 1, the circulation of lubricating oil is promoted. On the other hand, the retention property of lubricating oil is low. Therefore, a problem is raised in that the cooling performance of a wet friction plate by lubricating oil deteriorates.

The present invention addresses the above-described problem. An object of the present invention is to provide a method for producing a wet friction plate that can improve the retention property of lubricating oil in the fine groove formed by laser light.

SUMMARY OF INVENTION

In order to achieve the above object, as a characteristic of the present invention, there is provided a method for producing a wet friction plate that includes a friction material disposed along a circumferential direction on a surface of a core metal formed in a flat-plate ring shape. The method for producing a wet friction plate includes: a fine groove forming step of irradiating the friction material with laser light that is displaced relative to the friction material, thereby to form a concave fine groove on a surface of the friction material; and a crushing step of pressing the friction material to crush and deform the fine groove.

According to the characteristic of the present invention configured in this manner, in the method for producing a wet friction plate, the fine groove is formed by laser light. Thereafter, the friction material having the formed fine groove is pressed. Accordingly, the fine groove is crushed. Therefore, the surface inside the fine groove is formed into an uneven shape. This can improve the retention property of lubricating oil. In this case, the fine groove has a portion which has a groove width of 10 μm or more and 1000 μm or less and a depth of 10 μm or more and 1000 μm or less and which is dug such that the cross-sectional shape of the fine groove is a concave shape. This portion intermittently or continuously extends in a long-length manner. In this case, a rubber material or a cork material as well as a paper material that is an aggregate of fibers can be used as the friction material.

Moreover, as another characteristic of the present invention, the method for producing a wet friction plate further includes a friction material disposing step of disposing the friction material on the core metal, and the fine groove forming step is performed before the friction material disposing step.

According to the another characteristic of the present invention configured in this manner, in the method for producing a wet friction plate, the fine groove forming step is performed before the friction material disposing step. Therefore, the fine groove can be simply and precisely formed, compared to when the processing for the fine groove is performed to the friction material on the core metal.

Moreover, as another characteristic of the present invention, in the method for producing a wet friction plate, the crushing step is performed to the friction material disposed on the core metal.

According to the another characteristic of the present invention configured in this manner, in the method for producing a wet friction plate, the crushing step is performed to the friction material disposed on the metal core. Therefore, compared to when the crushing step is performed to a location other than the core metal, the crushing step can also serve as a step of sticking the friction material on the core metal. This can reduce the man-hours, which enables efficient production of the wet friction plate.

Moreover, as another characteristic of the present invention, the method for producing a wet friction plate further includes a friction material disposing step of disposing the friction material on the core metal, the fine groove forming step is performed to the friction material disposed on the core metal, and the crushing step is performed to the friction material disposed on the core metal.

According to the another characteristic of the present invention configured in this manner, in the method for producing a wet friction plate, the fine groove forming step and the crushing step are performed to the friction material disposed on the metal core. This enables the fine groove to be precisely formed in an accurate position on the core metal.

Moreover, as another characteristic of the present invention, the method for producing a wet friction plate further includes a friction material producing step of producing, as the friction material, a paper body that includes an aggregate of numerous fibers impregnated with thermosetting resin, and in the crushing step, the friction material is pressed while heated.

According to the another characteristic of the present invention configured in this manner, in the method for producing a wet friction plate, the friction material configured with a paper body that includes an aggregate of numerous fibers impregnated with thermosetting resin is pressed while heated. This restrains springback of the pressed friction material. Accordingly, the fine groove can be precisely crushed to produce a wet friction plate.

Moreover, as another characteristic of the present invention, in the method for producing a wet friction plate, the paper body containing the thermosetting resin in a semi-cured state is produced in the friction material producing step, and the friction material is heated so that the thermosetting resin in the semi-cured state is completely cured in the crushing step.

According to the another characteristic of the present invention configured in this manner, in the method for producing a wet friction plate, the friction material is heated in the crushing step. Accordingly, the thermosetting resin in the semi-cured state is completely cured. This restrains springback of the pressed friction material. Accordingly, the fine groove can be precisely crushed to produce a wet friction plate. Also, in this method for producing a wet friction plate, the thermosetting resin is in a semi-cured state. Therefore, a pressure with which the friction material is pressed can be reduced, compared to when a friction material containing completely cured thermosetting resin is pressed.

Moreover, as another characteristic of the present invention, in the method for producing a wet friction plate, an adhesive agent is disposed between on the core metal and on the friction material in the friction material disposing step, and the friction material is pressed so that the friction material is stuck on the core metal, in the crushing step.

According to the another characteristic of the present invention configured in this manner, in the method for producing a wet friction plate, an adhesive agent is disposed between the core metal and the friction material. Then, the friction material is pressed. Accordingly, the friction material is stuck on the core metal. Therefore, crushing of the fine groove and sticking of the friction material can be simultaneously performed. As a result, working efficiency can be improved.

DESCRIPTION OF EMBODIMENTS

Figure 1:
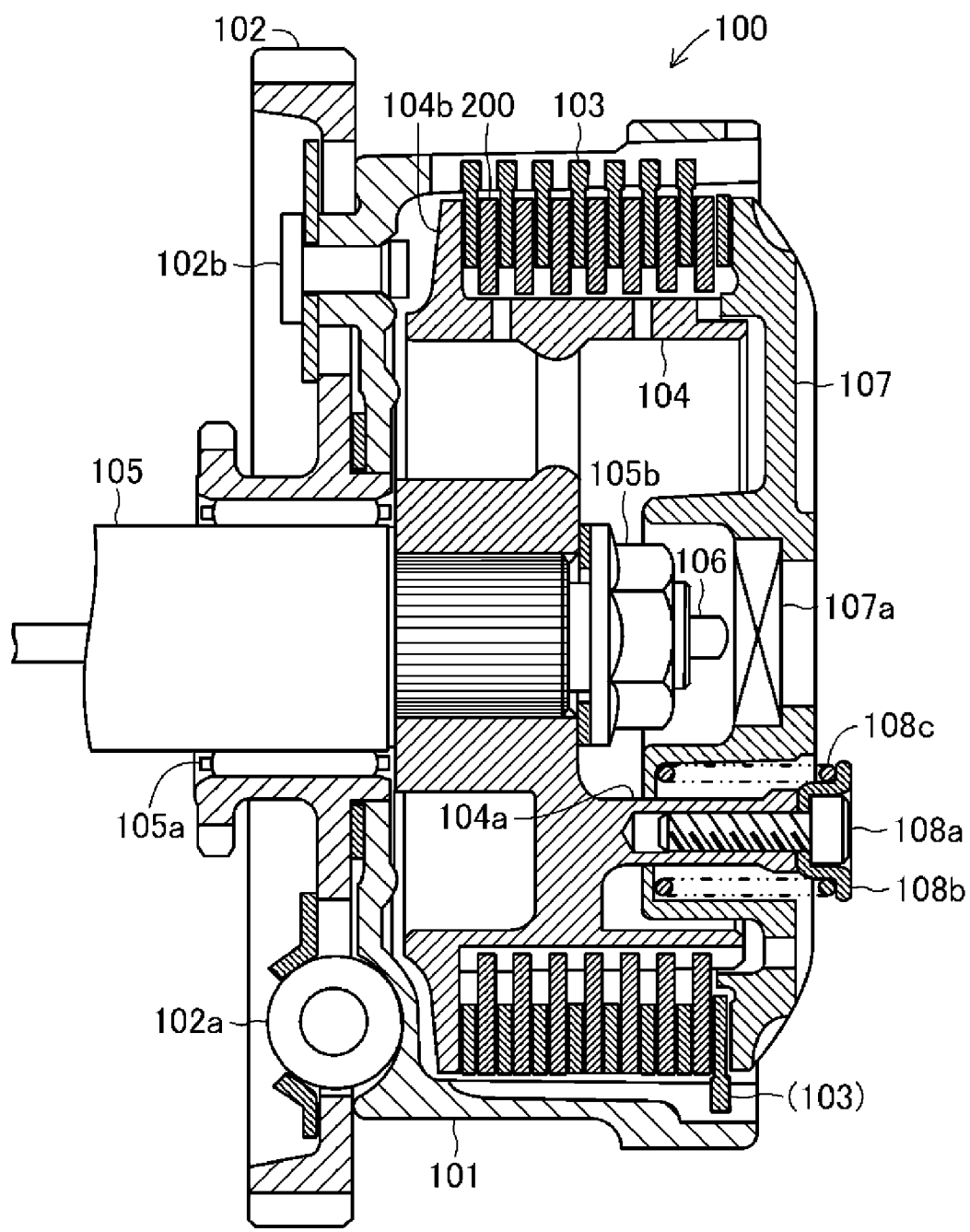
FIG. 1 is a cross-sectional view illustrating an entire configuration of a wet multiple disc clutch device including a wet friction plate according to the present invention.
Figure 2:
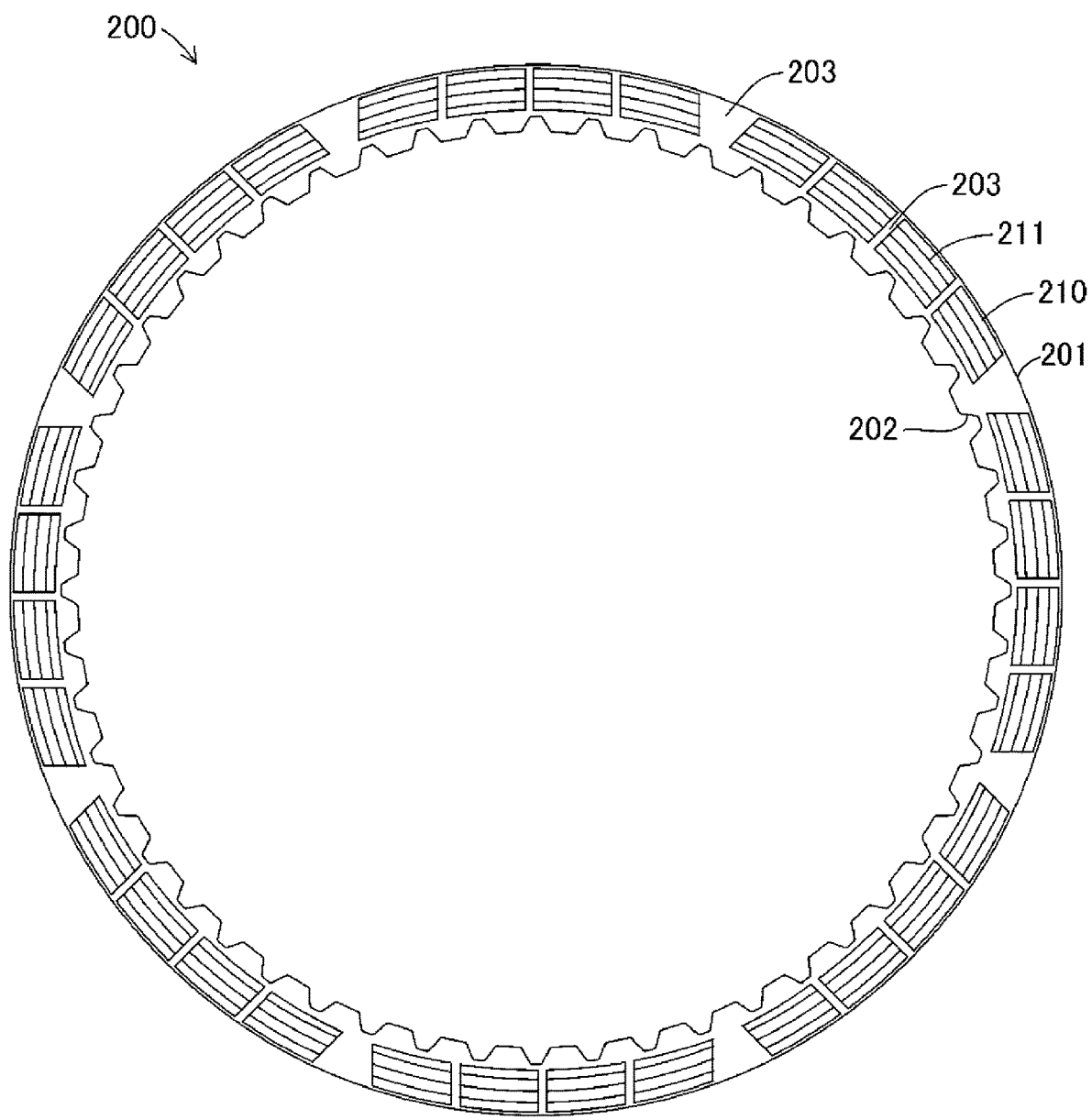
FIG. 2 is a plan view schematically illustrating an appearance configuration of a wet friction plate according to the present invention to be incorporated into the wet multiple disc clutch device illustrated in FIG. 1.

Hereinafter, one embodiment of the method for producing a wet friction plate according to the present invention will be described with reference to the drawings. FIG. 1 is a cross-sectional view schematically illustrating an entire configuration of a wet multiple disc clutch device 100 including a wet friction plate 200 according to the present invention. Also, FIG. 2 is a plan view schematically illustrating an appearance configuration of the wet friction plate 200 according to the present invention included by the wet multiple disc clutch device 100 illustrated in FIG. 1. It is noted that in the drawings referred herein, constituents are partly depicted schematically, for example, in an exaggerated manner, for facilitating understanding of the present invention. Therefore, the dimension, ratio, and others of each constituent may be varied.

This wet multiple disc clutch device 100 is a mechanical device for transmitting or interrupting driving force of an engine (not illustrated) as a motor in a two-wheeled motor vehicle (motorcycle) to a wheel (not illustrated) as a driven body. The wet multiple disc clutch device 100 is disposed between the engine and a transmission (not illustrated).

(Configuration of Wet Multiple Disc Clutch Device 100)

The wet multiple disc clutch device 100 includes a housing 101 made of aluminum alloy. The housing 101 is a member that configures part of the casing of the wet multiple disc clutch device 100. The housing 101 has a bottomed cylindrical shape. A side surface on the illustrated left side of this housing 101 is fixed with an input gear 102 through a torque damper 102a by a rivet 102b. The input gear 102 meshes with an unillustrated drive gear that is driven to rotate by a drive of the engine, and is accordingly driven to rotate. On the inner circumferential surface of the housing 101, a plurality of (eight, in the present embodiment) clutch plates 103 are retained by spline engagement in a state in which they can be displaced along the axial direction of the housing 101 and rotated integrally with the housing 101.

The clutch plates 103 are each a flat-plate ring-shaped component to be pushed against the wet friction plate 200 described later. The clutch plate 103 is obtained by punching a ring shape from a thin plate material formed of steel plate cold commercial (SPCC). Unillustrated oil grooves described later are formed on both surfaces (front and back surfaces) of the clutch plate 103. The oil grooves each have a depth of several μm to several tens μm such that lubricating oil is retained. Also, both side surfaces (front and back surfaces) having oil grooves formed thereon of the clutch plate 103 are subjected to a surface curing treatment for a purpose of improving abrasion resistance. It is noted that this surface curing treatment is not directly involved in the present invention. Therefore, explanation of this surface curing treatment will be omitted.

Inside the housing 101, a friction plate holder 104 formed in a substantially cylindrical shape is disposed coaxially with the housing 101. On the inner circumferential surface of this friction plate holder 104, a large number of spline grooves is formed along the axial direction of the friction plate holder 104. Into the spline grooves, a shaft 105 is spline-fitted. The shaft 105 is a hollow axial body. One end side (illustrated right side) of the axial body rotatably supports the input gear 102 and the housing 101 via a needle bearing 105a. At the same time, the end side fixes and supports, via a nut 105b, the friction plate holder 104 into which the end side is spline-fitted. That is, the friction plate holder 104 rotates integrally with the shaft 105. On the other hand, the other end (illustrated left side) of the shaft 105 is linked to the unillustrated transmission of a two-wheeled motor vehicle.

An axial push rod 106 extends through the hollow part of the shaft 105 and projects from the one end (illustrated right side) of the shaft 105. The push rod 106 is linked to an unillustrated clutch operation lever of a two-wheeled motor vehicle at a side (illustrated left side) opposite to an end projecting from one end (illustrated right side) of the shaft 105. The push rod 106 slides along the axial direction of the shaft 105 inside the hollow part of the shaft 105 in response to operation of the clutch operation lever.

A plurality of (seven, in the present embodiment) wet friction plates 200 are retained on the outer circumferential surface of the friction plate holder 104 by spline fitting in a state of sandwiching the clutch plates 103, in such a manner that the wet friction plates 200 can be displaced along the axial direction of the friction plate holder 104 and rotated integrally with the friction plate holder 104.

On the other hand, the inside of the friction plate holder 104 is filled with a prescribed amount of lubricating oil (not illustrated). At the same time, three tubular support columns 104a are formed (only one is illustrated). Lubricating oil is supplied between the wet friction plate 200 and the clutch plate 103 to absorb friction heat generated between the wet friction plate 200 and the clutch plate 103 and prevent wear of friction material 210.

Also, the three tubular support columns 104a each project toward the outside (illustrated right side) in the axial direction of the friction plate holder 104. A pressing cover 107 disposed coaxially with the friction plate holder 104 is assembled to each of the tubular support columns 104a via a bolt 108a, a backing plate 108b, and a coil spring 108c. The pressing cover 107 has a substantial circular plate shape with an outer diameter that is substantially the same as the outer diameter of the wet friction plate 200. The pressing cover 107 is pressed to the friction plate holder 104 side by the coil spring 108c. Also, a release bearing 107a is disposed on the inner center of the pressing cover 107 in a position facing the tip end portion on the illustrated right side of the push rod 106.

(Configuration of Wet Friction Plate 200)

In particular, as illustrated in FIG. 2, the wet friction plate 200 includes an oil groove 203 and a friction material 210 on a flat-plate ring-shaped core metal 201. The core metal 201 is a member that serves as a base of the wet friction plate 200. The core metal 201 is obtained by punching a ring shape from a thin plate material formed of steel plate cold commercial (SPCC). In this case, an internally-toothed spline 202 for spline fitting with the friction plate holder 104 is formed on the inner circumferential portion of the core metal 201.

On a side facing the clutch plate 103 of this wet friction plate 200, that is, on a ring-shaped plate surface facing the clutch plate 103 of the core metal 201, a plurality of (32, in the present embodiment) small piece-shaped friction materials 210 is disposed along the circumferential direction of the core metal 201 with the oil grooves 203, each configured as a space, interposed between the friction materials 210.

The oil grooves 203 are each a channel that guides lubricating oil between the inner circumferential edge and the outer circumferential edge of the core metal 201 of the wet friction plate 200. Also, the oil groove 203 is an oil retaining portion for allowing lubricating oil to exist between the wet friction plate 200 and the clutch plate 103. The oil groove 203 is configured as a space between the friction material 210 and the friction material 210 which are next to each other. In the present embodiment, the oil groove 203 includes a fan-shaped portion and a linearly extending portion. The fan-shaped portion is formed between every four small piece-shaped friction materials 210. The linearly extending portion is formed each between the four friction materials 210 disposed between two fan-shaped oil grooves 203. It is noted that the geometry and number of the oil grooves 203 are appropriately set depending on the specification of the wet friction plate 200.

The friction materials 210 increase the frictional force on the clutch plate 103. The friction materials 210 are configured with small piece-shaped paper materials that are stuck along the circumferential direction of the core metal 201. More particularly, the friction material 210 is configured with a paper body impregnated with a thermosetting resin subsequently cured.

Here, the paper body is configured with a filler which is added to an aggregate of at least one of organic fibers and inorganic fibers. Here, the organic fibers to configure the paper body may be one or a combination of two or more of wood pulp, synthetic pulp, polyester-based fiber, polyamide-based fiber, polyimide-based fiber, polyvinyl alcohol modified fiber, polyvinyl chloride fiber, polypropylene fiber, polybenzimidazole fiber, acryl fiber, carbon fiber, phenol fiber, nylon fiber, cellulose fiber, and others. The inorganic fibers to configure the paper body may be one or a combination of two or more of glass fiber, rock wool, potassium titanate fiber, ceramic fiber, silica fiber, silica-alumina fiber, kaolin fiber, bauxite fiber, kayanoid fiber, boron fiber, magnesia fiber, metal fiber, and others.

The filler exerts a function as a friction adjuster and/or a solid lubricant. The filler may be one or a combination of two or more of barium sulfate, calcium carbonate, magnesium carbonate, silicon carbide, boron carbide, titanium carbide, silicon nitride, boron nitride, alumina, silica, zirconia, cashew dust, rubber dust, diatomaceous earth, graphite, talc, kaolin, magnesium oxide, molybdenum disulfide, nitrile rubber, acrylonitrile-butadiene rubber, styrene butadiene rubber, silicon rubber, fluorine rubber, and others. Also, examples of thermosetting resin include phenol-based resin, melamine resin, epoxy resin, urea resin, and silicone resin.

This friction material 210 has a thickness of 0.3 mm or more and 0.6 mm or less. The friction material 210 is stuck on the core metal 201 through an unillustrated adhesive agent. In the present embodiment, the friction materials 210 are configured with small-piece groups each including four small pieces that have a quadrangular shape extending in the circumferential direction of the core metal 201 and are disposed in the circumferential direction of the core metal 201 with three linear oil grooves 203 interposed between the friction materials 210. At the same time, the friction materials 210 are configured with eight small-piece groups described above disposed in the circumferential direction of the core metal 201 with eight fan-shaped oil grooves 203 interposed between the eight small-piece groups. It is noted that the geometry and number of the friction materials 210 are not limited to the present embodiment. The geometry and number of the friction materials 210 are appropriately set depending on the specification of the wet friction plate 200.

Figure 3:
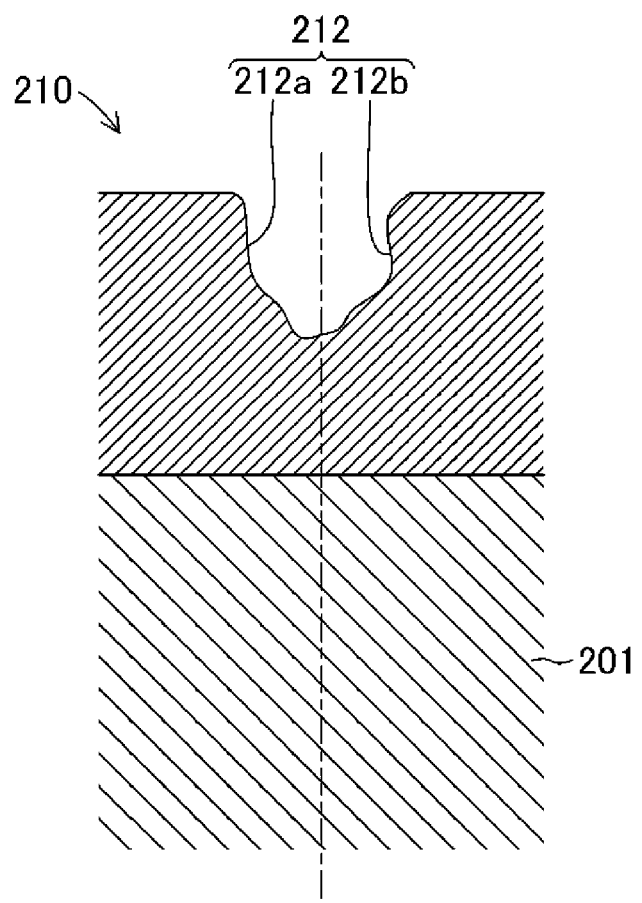
FIG. 3 is a partially enlarged cross-sectional view illustrating a configuration of a fine groove formed on a friction material in the wet friction plate illustrated in FIG. 2.

A fine groove 211 is formed on the surface of this friction material 210. The fine groove 211 is a portion for defining the retention property and the discharge property of lubricating oil on the friction material 210. The fine groove 211 has a groove shape which is recessed in a concave manner on the surface of the friction material 210. More specifically, as illustrated in FIG. 3, the fine groove 211 has a groove shape that opens on the surface of the friction material 210 and is inwardly recessed in a concave manner. In this case, an intra-groove surface 212 that forms the fine groove 211 is configured with an uneven surface having an irregular uneven portion.

In the present embodiment, the fine groove 211 has an inclined surface in which two side surfaces 212a and 212b approach each other toward the inside of the friction material 210. That is, the cross-sectional shape of the fine groove 211 is a substantial V shape (triangular shape). In this case, the fine groove 211 is formed such that it has a groove width of about 100 μm and a deepest depth of about 200 μm in the present embodiment.

This fine groove 211 has an arc shape which continuously extends along the circumferential direction of the core metal 201 on the friction material 210. In the present embodiment, the fine groove 211 is formed by three arcs aligning in the radial direction of the wet friction plate 200. In this case, the three arcs are each configured with a circle having the same center as the center of the core metal 201.

(Production of Wet Friction Plate 200)

Figure 4:
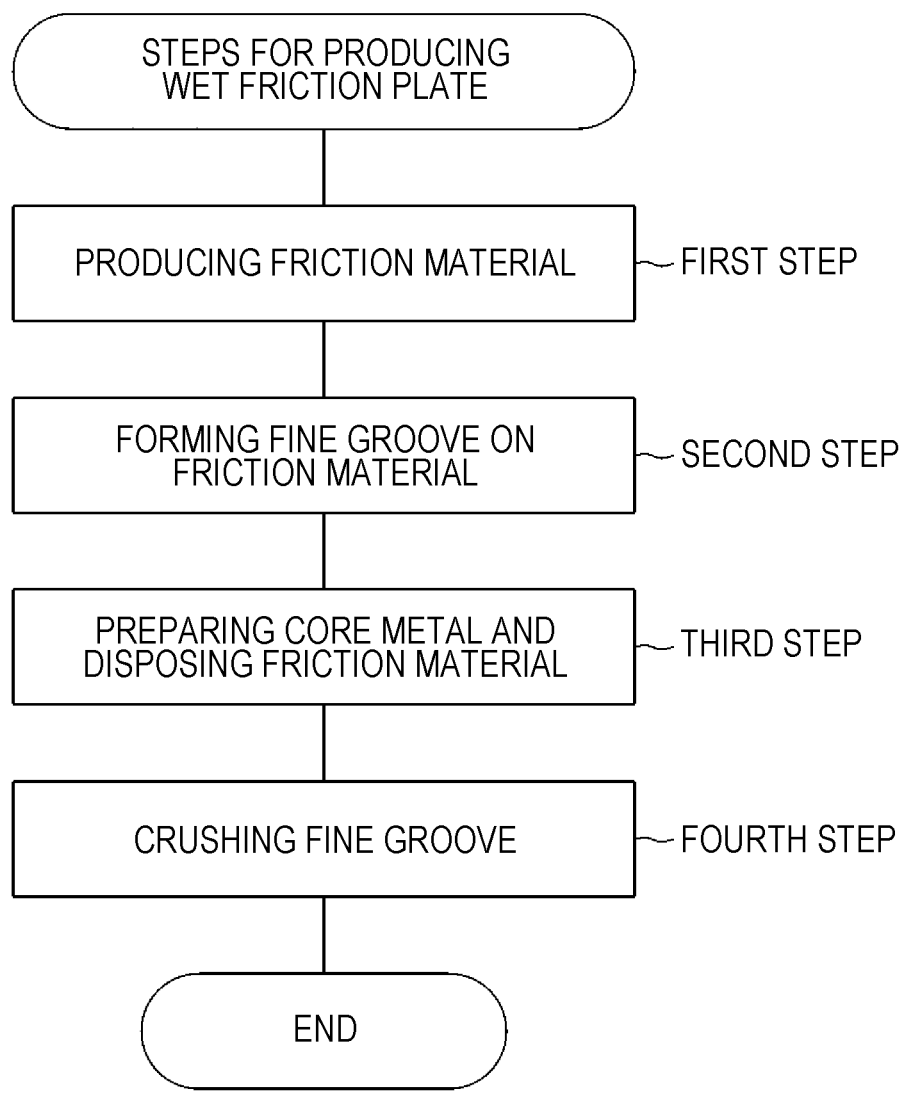
FIG. 4 is a flowchart illustrating steps for producing a wet friction plate according to the present invention.

Next, a method for producing the wet friction plate 200 configured in this manner will be described with reference to FIG. 4. First, an operator produces the friction material 210 as a first step (friction material producing step). Specifically, the producing step of the friction material 210 mainly includes a sheet making step and a curing step.

The sheet making step is a step of filtering out fibers dispersed in liquid and forming a long-length sheet-shaped paper body. The sheet making step is a known method. Specifically, the sheet making step is a work of drying a raw material filtered out from a raw material liquid in a slurry state into a long-length sheet-like shape to obtain a long-length sheet-shaped paper body. The raw material liquid is prepared by stirring a raw material of a paper body poured in water, i.e., the above-described organic fibers and/or the above-described inorganic fibers, a filler, and an aggregating agent. In this case, the paper body is dried until a moisture content of 10% or less is reached.

Next, the curing step is a work of curing thermosetting resin with which the paper body is impregnated. Specifically, the operator sprays thermosetting resin liquid (phenol-based resin liquid) on the paper body or immerses the paper body in thermosetting resin liquid, so that the paper body is impregnated with the thermosetting resin liquid. Thereafter, the thermosetting resin liquid is cured through heating by a heater, a heated roller, or the like. In this case, the operator cures the thermosetting resin liquid into a semi-cured state. In the semi-cured state, curing of the thermosetting resin liquid has proceeded in a range in which the thermosetting resin liquid changing into solid is not completely cured. Accordingly, the operator can obtain the friction material 210 configured with the paper body containing the thermosetting resin liquid in the semi-cured state.

Next, the operator forms the fine groove 211 on the friction material 210 as a second step (fine groove forming step). In this case, the operator uses a laser processor 300 to form the fine groove 211. Here, the laser processor 300 is a mechanical device for irradiating the friction material 210 with laser light L to form the fine groove 211.

Figure 5:
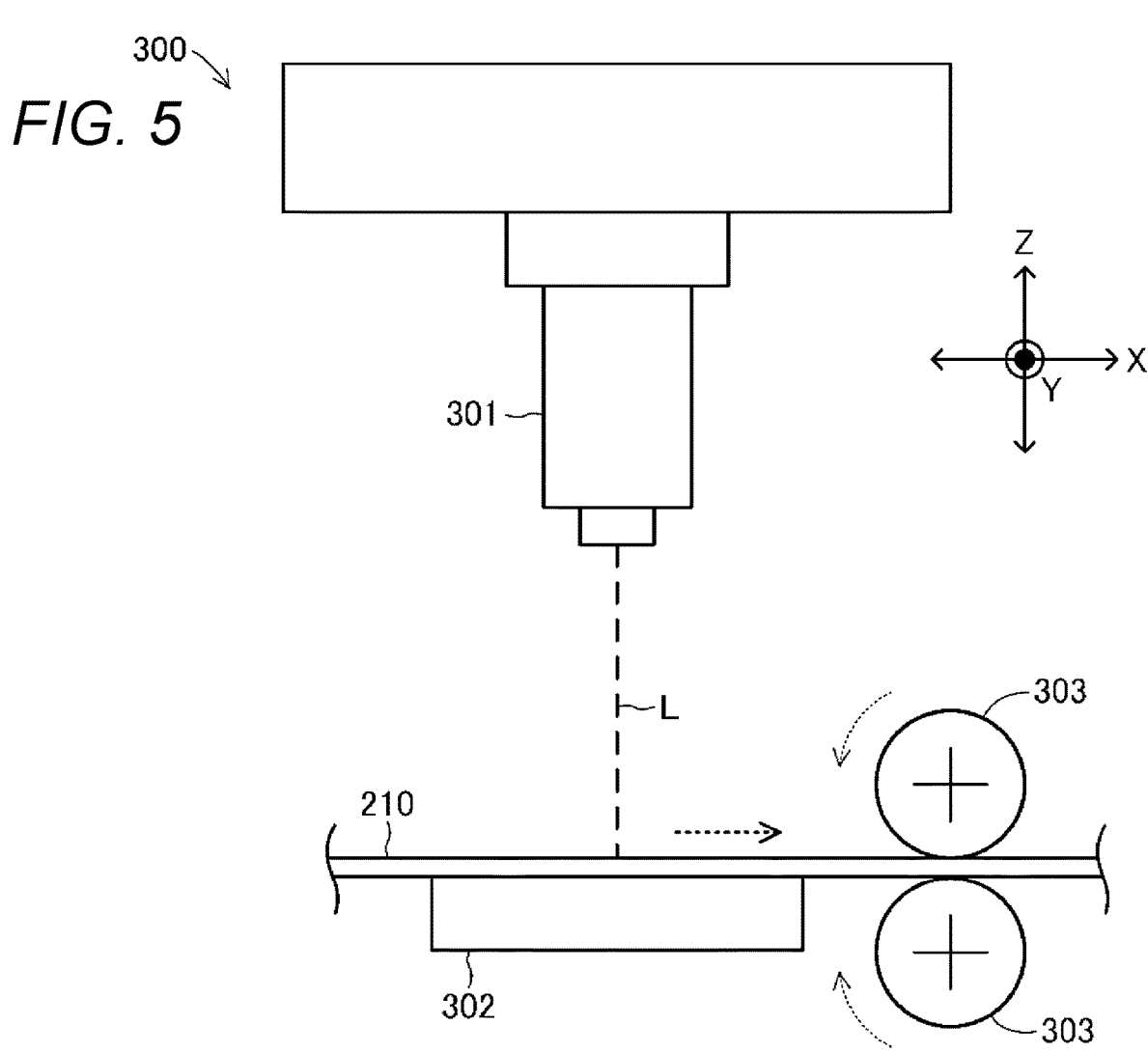
FIG. 5 is a side view schematically illustrating a configuration of a laser processor used in a fine groove forming step in the steps of producing a wet friction plate illustrated in FIG. 4.

As illustrated in FIG. 5, this laser processor 300 mainly includes a laser oscillator (not illustrated), a laser adjustment optical system (not illustrated), a laser head 301, a work table 302, a work conveying mechanism 303, and a controller (not illustrated). The laser oscillator is a mechanical device for emitting laser light L for forming the fine groove 211 on the friction material 210. In the present embodiment, the laser oscillator is configured as a 60 W output oscillator for generating pulse laser light having a frequency of 300 kHz and a short pulse width of nanoseconds, picoseconds, femtoseconds, or the like. The laser adjustment optical system is configured with various optical elements such as a lens and a mirror and an optical component including optical fibers and others. The various optical elements guide laser light L to the laser head 301 while performing various adjustments such as correction of the beam diameter, beam shape, and aberration of laser light L emitted from the laser oscillator.

The laser head 301 is an optical device that emits laser light L guided from the laser adjustment optical system toward the work table 302 to collect light onto the wet friction plate. This laser head 301 is configured such that it can be displaced relative to the work table 302 in three axis directions of X-axis direction, Y-axis direction, and Z-axis direction which are orthogonal to one another. It is noted that the laser oscillator, the laser adjustment optical system, and the laser head 301 themselves are known mechanical devices.

The work table 302 is a board that supports the friction material 210 from below in a position facing the laser head 301. The work table 302 is configured with a metal material formed in a flat plate shape. The work conveying mechanism 303 is a mechanical device for conveying the long-length friction material 210 from one side to the other side in the lengthwise direction. The work conveying mechanism 303 mainly includes a pair of drive rollers which sandwich the friction material 210.

The controller is configured with a microcomputer including a CPU, a ROM, a RAM, and others. The controller comprehensively controls an entire action of the laser processor 300. Specifically, the controller controls actions of the laser oscillator, the laser adjustment optical system, the laser head 301, and the work conveying mechanism 303, in response to instructions by the operator. In this manner, the controller disposes the friction material 210 on the work table 302. At the same time, the controller displaces the laser head 301 while irradiating the friction material 210 positioned on the work table 302 with laser light L, such that the fine groove 211 is formed.

In this second step, the operator draws out the friction material 210 wound in a roll shape. At the same time, the end portion of the drawn friction material 210 is grasped by the work conveying mechanism 303. Thereafter, the operator instructs the controller of the laser processor 300 to form the fine groove 211. In response to this instruction, the controller controls the action of the work conveying mechanism 303 to intermittently convey the friction material 210. This allows the friction material 210 to be intermittently positioned on the work table 302. Subsequently, the controller displaces the laser head 301 in the X-axis direction and the Y-axis direction relative to the friction material 210 positioned on the work table 302 while allowing laser light L to be emitted from the laser head 301. Accordingly, laser light L is displaced on the friction material 210 thereby to form the fine groove 211.

Figure 6:
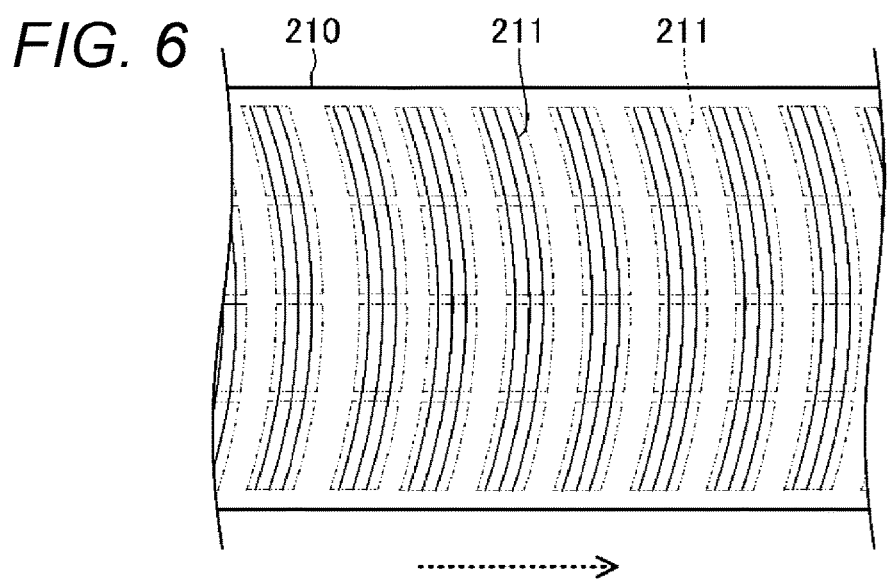
FIG. 6 is a plan view illustrating a long-length friction material having fine grooves formed by the laser processor illustrated in FIG. 5.
Figure 7:
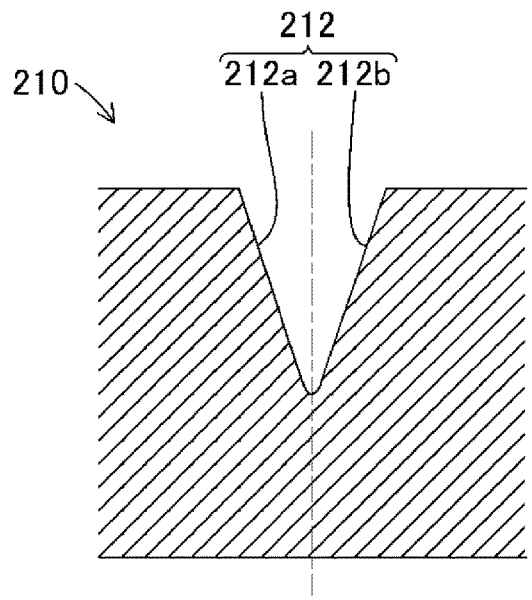
FIG. 7 is a partially enlarged cross-sectional view illustrating a configuration of the fine groove by the laser processor illustrated in FIG. 5.

In the present embodiment, the laser processor 300 forms, as illustrated in FIG. 6, three fine grooves 211 formed on each of the above-described four friction materials 210 disposed between two fan-shaped oil grooves 203 described above, in such a state that the fine grooves 211 are continuously connected along the width direction of the friction material 210. In this case, the formed fine grooves 211 each have, as illustrated in FIG. 7, a V-shaped (triangular) cross-sectional shape. The side surfaces 212a and 212b which defines each of the fine grooves 211 have few uneven portions and are a substantially flat planar surface. Also, the fine grooves 211 are each formed so as to be deeper than the depth of the groove of the finally formed fine groove 211. It is noted that in FIG. 6, the friction material 210 in the fine groove 211 is virtually denoted by a double dot-and-dash line. Also, in FIG. 5 and FIG. 6, the conveying direction of the long-length friction material 210 is denoted by a broken line arrow.

Next, the operator prepares the core metal 201 and disposes the friction material 210 on each of two plate surfaces of this core metal 201, as a third step (friction material disposing step). Here, the core metal 201 is formed in an annular shape having the splines 202 by separate press processing. This press processing is a known method. Therefore, explanation of the press processing will be omitted.

The operator applies an adhesive agent in a liquid state on the entire surface of the plate surface of the core metal 201 using a tool such as a brush or a roller. Thereafter, the friction material 210 is placed on this adhesive agent. Here, thermosetting resin in a liquid state is used as the adhesive agent. Also, the operator may cut the friction material 210 extending in a band shape in a state of being placed on the core metal 201, to form the small piece-shaped friction material 210. Alternatively, the friction materials 210, which are obtained by previously cutting the friction material 210 extending in a band shape into small pieces, may be placed on the core metal 201. A method for disposing these friction materials 210 on the core metal 201 is a known technique.

The friction materials 210 disposed on the core metal 201 are in a state of being temporarily fixed on the core metal 201 by adhesive force of the uncured adhesive agent. Therefore, the operator can dispose the friction materials 210 on both surfaces by turning the core metal 201 upside down. It is noted that in this third step, the operator can apply an adhesive agent only on a position where the friction materials 210 are to be disposed. Alternatively, the operator can apply an adhesive agent only in an annular shape along the circumferential direction where the friction materials 210 are to be placed. Also, the operator can apply an adhesive agent on the friction materials 210.

Next, the operator performs, as a fourth step, crushing processing to the fine groove 211 (crushing step). This crushing processing also serves as sticking processing of the friction material 210 on the core metal 201. The crushing step is performed using a hot press processor 400. Here, the hot press processor 400 is a mechanical device for pressing the friction material 210 while heating, to crush the fine groove 211 and fix the friction material 210 to the core metal 201. This hot press processor 400 is a known mechanical device. Therefore, although the configuration of the hot press processor 400 will be briefly described below, detailed explanation thereof will be omitted.

Figure 8:
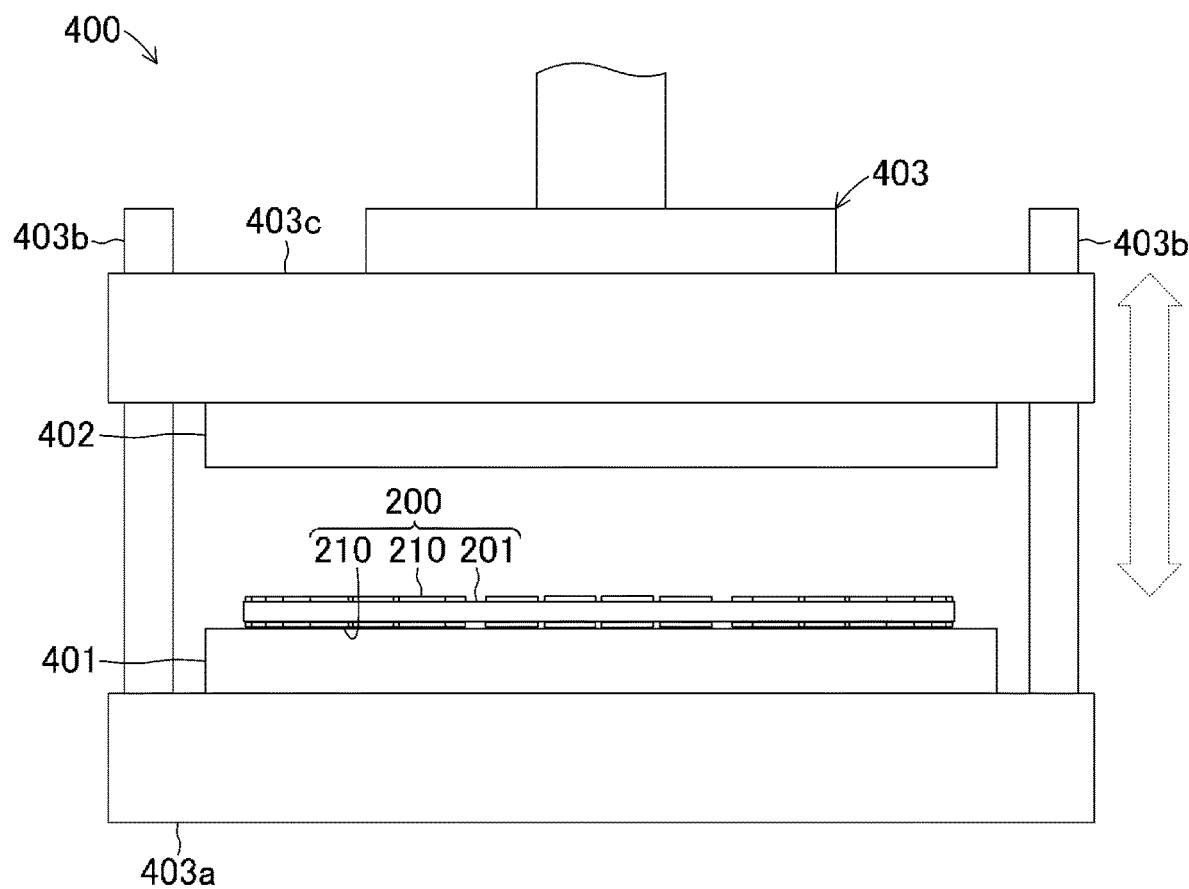
FIG. 8 is a side view schematically illustrating a configuration of a hot press processor used in a fine groove crushing step in the steps of producing a wet friction plate illustrated in FIG. 4.

This hot press processor 400 mainly includes, as illustrated in FIG. 8, a lower pressing plate 401, an upper pressing plate 402, a movable support device 403, and a controller. The lower pressing plate 401 is a component on which the core metal 201 is to be placed. At the same time, the lower pressing plate 401 operates together with the upper pressing plate 402 to sandwich the core metal 201 for heating and pressing. The lower pressing plate 401 is configured with a metal material formed in a plate shape. In this case, a heater (not illustrated) to perform heating by energization is disposed inside the lower pressing plate 401. This lower pressing plate 401 is fixed to the upper surface of a lower base 403a of the movable support device 403.

The upper pressing plate 402 is a component that is disposed to face the top of the lower pressing plate 401. The upper pressing plate 402 operates together with the lower pressing plate 401 to sandwich the core metal 201 for heating and pressing. The upper pressing plate 402 is configured with a metal material formed in a plate shape. A heater (not illustrated) to perform heating by energization is disposed inside this upper pressing plate 402. This upper pressing plate 402 is fixed to a lower surface of an upper base 403c of the movable support device 403.

The movable support device 403 is a mechanical device that supports the upper pressing plate 402 such that it can approach or move away from the lower pressing plate 401 (see the illustrated broken line arrow). The movable support device 403 includes the lower base 403a, a support column 403b, and the upper base 403c. The lower base 403a is a metal flat plate body that fixes and supports the lower pressing plate 401. The support column 403b is a component that supports the upper base 403c while guiding it in a direction in which the upper pressing plate 402 approaches or moves away from the lower pressing plate 401. The support column 403b is configured with a plurality of metal bar bodies rising at the outer edge of the lower base 403a.

The upper base 403c is a metal flat plate body that supports the upper pressing plate 402. Through holes are formed in a position corresponding to the support column 403b at the outer edge of this upper base 403c. The support column 403b slidably fits into each of these through holes. Also, this upper base 403c is supported by a hydraulic driving device (not illustrated) that raises or lowers the upper base 403c by hydraulic pressure.

The controller is configured with a microcomputer including a CPU, a ROM, a RAM, and others. The controller comprehensively controls an entire action of the hot press processor 400. Specifically, the controller controls actions of heaters in the lower pressing plate 401 and the upper pressing plate 402 and the hydraulic driving device in the movable support device 403 in response to instructions by the operator. In this manner, the core metal 201 is pressed by the lower pressing plate 401 and the upper pressing plate 402 under heating. Accordingly, the friction material 210 including the fine groove 211 is crushed.

In this fourth step, the operator places, onto the lower pressing plate 401, the core metal 201 having the temporarily fixed friction material 210. Thereafter, the operator instructs the controller of the hot press processor 400 to heat and press the friction material 210. In response to this instruction, the controller controls actions of heaters in the lower pressing plate 401 and the upper pressing plate 402. In this manner, the lower pressing plate 401 and the upper pressing plate 402 are heated to a prescribed temperature. Thereafter, the controller controls an action of the hydraulic driving device to lower the upper pressing plate 402 toward the lower pressing plate 401 side. In this manner, the entirety of the core metal 201 is pressed (see the illustrated broken line arrow).

Accordingly, the core metal 201 is heated and pressed in a state of being sandwiched between the lower pressing plate 401 and the upper pressing plate 402. In this case, a temperature for heating the friction material 210, a pressure for pressurizing the friction material 210, and a time taken for the heating and pressurizing are appropriately set depending on the specification of the wet friction plate 200. However, at least a pressure and time for compressing the friction material 210 in the thickness direction is necessary. Furthermore, a temperature and time for completely solidifying thermosetting resin is necessary. Here, complete solidification of thermosetting resin indicates that thermosetting resin is solidified enough to endure use of the wet friction plate 200.

Accordingly, in the core metal 201, thermosetting resin in a semi-cured state contained inside the friction material 210 and thermosetting resin applied between the core metal 201 and the friction material 210 are both solidified. Therefore, the friction material 210 is solidified in a state of being compressed in the thickness direction. At the same time, the friction material 210 is fixed and stuck on the core metal 201. In this case, the friction material 210 is fixed and stuck on the core metal 201 in a state of being compressed such that the thickness becomes 1/10 or more and ½ or less of the thickness before pressurization.

Also, the fine groove 211 formed on the friction material 210 is crushed in the thickness direction of the friction material 210, as illustrated in FIG. 3. Specifically, the depth of the groove of the fine groove 211 is reduced. At the same time, the pointed bottom shape of the groove is deformed into a broad shape. Also, unevenness occurs on the side surfaces 212a and 212b. Therefore, the cross-sectional shape becomes, as an entirety, a substantial V shape which is crushed in the thickness direction of the friction material 210.

Further, the controller controls such that the core metal 201 is heated and pressed by the lower pressing plate 401 and the upper pressing plate 402 for a prescribed time. Thereafter, the controller controls an action of the hydraulic driving device to raise the upper pressing plate 402, so that the upper pressing plate 402 moves away from the lower pressing plate 401. At the same time, the controller stops heating by heaters of the lower pressing plate 401 and the upper pressing plate 402 (see the illustrated broken line arrow). Thus, the operator can take out the core metal 201, on which the friction material 210 is fixed and stuck, i.e., the wet friction plate 200, from on the lower pressing plate 401. Thereafter, the operator performs an adjusting step and a test step of the friction property to complete the wet friction plate 200. Since these steps are not directly involved in the present invention, explanation thereof will be omitted.

(Action of Wet Friction Plate 200)

Next, an action of the wet friction plate 200 configured in this manner will be described. As described above, this wet friction plate 200 is assembled in the wet multiple disc clutch device 100 for use. Then, as described above, this wet multiple disc clutch device 100 is disposed between the engine and the transmission in the vehicle. In response to an operation of a clutch operation lever by an operator of the vehicle, driving force of the engine is transmitted to the transmission or interrupted.

That is, when the operator of the vehicle (not illustrated) operates a clutch operation lever (not illustrated) to retreat (displace to the illustrated left side) the push rod 106, the tip end of the push rod 106 is in a state of not pressing the release bearing 107a. Therefore, the pressing cover 107 presses the clutch plate 103 by elastic force of the coil spring 108c. Accordingly, the clutch plate 103 and the wet friction plate 200 are in a state of being friction connected. In this state, the clutch plate 103 and the wet friction plate 200 are pushed against each other while being displaced toward a side of a receiving part 104b formed in a flange shape on the outer circumferential surface of the friction plate holder 104. As a result, driving force of the engine, transmitted to the input gear 102, is transmitted to the transmission via the clutch plate 103, the wet friction plate 200, the friction plate holder 104, and the shaft 105.

On the other hand, when the operator of the vehicle operates the clutch operation lever (not illustrated) to advance (displace to the illustrated right side) the push rod 106, the tip end of the push rod 106 is in a state of pressing the release bearing 107a. Accordingly, the pressing cover 107 is displaced to the illustrated right side against elastic force of the coil spring 108c. Then, the pressing cover 107 and the clutch plate 103 move away from each other. This displaces the clutch plate 103 and the wet friction plate 200 to the pressing cover 107 side and releases the state in which they are pushed against each other to be connected. In this manner, the clutch plate 103 and the wet friction plate 200 move away from each other. As a result, driving force from the clutch plate 103 to the wet friction plate 200 comes not to be transmitted. In this manner, transfer of driving force of the engine transmitted to the input gear 102 to the transmission is interrupted.

In a clutch ON state, this clutch plate 103 and the wet friction plate 200 are in friction contact with each other. In this state, lubricating oil existing on the friction material 210 partly enters the fine groove 211, in the fine groove 211 formed on the surface layer of the friction material 210. In this case, the surface area of the intra-groove surface 212 of the fine groove 211 increases because of unevenness. This increases the amount of lubricating oil penetrating into the internal structure of the friction material 210. As a result, the cooling effect of the friction material 210 can be improved.

In a clutch OFF state, the clutch plate 103 and the wet friction plate 200 are spaced apart from each other. In this state, the retention property of lubricating oil in the fine groove 211 is improved by unevenness formed on the intra-groove surface 212, in the fine groove 211. Therefore, the cooling effect of the friction material 210 can be improved.

Also, even when the clutch plate 103 and the wet friction plate 200 are pressure contacted and separated in a repeated manner, the bottom formed broadly in a non-pointed manner of the fine groove 211 can restrain occurrence or progress of breaks or cracks of the fine groove 211. In this manner, durability of the friction material 210 can be improved.

As understood from the above-described explanation of actions, according to the above-described embodiment, the fine groove 211 is crushed to form the side surfaces 212a and 212b having a heavily contoured uneven surface, even when the fine groove 211 is formed by laser, in the method for producing the wet friction plate 200. Therefore, the retention property of lubricating oil in the fine groove 211 can be improved.

Furthermore, embodiments of the present invention are not limited to the above-described embodiment. Various modifications are possible as long as such modifications do not depart from the object of the present invention. It is noted that in modification examples described below, a constituent part similar to the wet friction plate 200 in the above-described embodiment is assigned with a reference sign corresponding to the reference sign assigned to the wet friction plate 200. Also, explanation thereof will be omitted.

For example, in the above-described embodiment, the cross-sectional shape of the fine groove 211 is a substantial V shape (triangular shape). However, the intra-groove surface 212 is formed in a distorted shape by the crushing step. Therefore, the fine groove 211 can also be formed into a shape other than the V shape, such as a U shape or an arc shape. Also, the fine groove 211 can be formed into a shape other than these shapes.

Also, in the above-described embodiment, the fine groove 211 has a groove width of about 100 μm and a deepest depth of about 200 μm. However, the fine groove 211 ay have a width of 10 μm or more and 1000 μm or less. Also, the fine groove 211 may have a depth of 10 μm or more and 1000 μm or less.

Also, in the above-described embodiment, the fine groove 211 has an arc shape which continuously extends along the circumferential direction of the core metal 201 on the friction material 210. However, the fine groove 211 may extend in the radial direction of the core metal 201 or other directions. In this case, the fine groove 211 may also extend in the circumferential direction of the core metal 201, the radial direction of the core metal 201, or other directions, in a continuous linear or curved manner. Alternatively, the fine groove 211 may be formed in an intermittent linear or curved manner.

Also, in the above-described embodiment, the fine groove 211 is formed by three arcs aligning in the radial direction of the wet friction plate 200. In this case, the three arcs are each configured with a circle having the same center as the center of the core metal 201. However, at least one fine groove 211 may be formed. Also, when the fine groove 211 is configured with a plurality of arcs aligning in the radial direction of the wet friction plate 200, the arcs may naturally have radiuses different from one another.

Also, in the above-described embodiment, the fine groove 211 having a substantial V-shaped (triangular) cross-sectional shape is formed in the step of forming the fine groove 211 in the second step. However, in the step of forming the fine groove 211 in the second step, a shape other than a V shape, such as a U shape, a rectangular shape, or an arc shape, may also be formed. In addition, the fine groove 211 can also be formed in a shape other than these.

Also, in the above-described embodiment, the step of forming the fine groove 211 was performed to the friction material 210 before disposed on the core metal 201. Accordingly, the operator can simply form the highly precise fine groove 211, compared to when the fine groove 211 is formed to the friction material on the core metal. In this case, the operator can reliably prevent the fine groove 211 from being mistakenly formed on the core metal 201. However, naturally, the step of forming the fine groove 211 may be performed to the friction material 210 disposed on the core metal 201. This enables the operator to precisely form the fine groove 211 in an accurate position on the core metal 201.

Also, in the above-described embodiment, the step of crushing the fine groove 211 is performed to the friction material 210 disposed on the core metal 201. Accordingly, the operator can also perform the step of sticking the friction material 210 onto the core metal 201 at the same time. This can reduce the man-hours, which enables efficient production of the wet friction plate 200. However, naturally, the step of crushing the fine groove 211 may be performed to the friction material 210 before disposed on the core metal 201. This enables the operator to form the friction material 210 of different type or the fine groove 211 of different type by crushing in a separate step.

Also, in the above-described embodiment, the step of producing the friction material 210 is performed in the first step. However, in the method for producing a wet friction plate according to the present invention, a commercially available paper body or friction material 210 may be acquired instead of producing the friction material 210.

Also, in the above-described embodiment, the thermosetting resin is cured into a semi-cured state in the step of producing the friction material 210 in the first step. Accordingly, the operator can restrain springback of the pressed friction material 210 and precisely crush the fine groove 211 in the step of crushing the fine groove 211 in the fourth step to produce the wet friction plate 200. Also, in this case, in the step of crushing the fine groove 211 in the fourth step, a pressure with which the friction material 210 is pressed can be reduced, compared to when the friction material 210 containing completely cured thermosetting resin is pressed. However, in the step of producing the friction material 210 in the first step, thermosetting resin may also be completely cured. In this case, in the step of crushing the fine groove 211 in the fourth step, the friction material 210 containing completely cured thermosetting resin is pressed to crush the fine groove 211.

Also, in the above-described embodiment, the friction material 210 is pressed while heated in the step of crushing the fine groove 211 in the fourth step. However, the friction material 210 may be merely pressed without being heated in the step of crushing the fine groove 211 in the fourth step. Also, in this method for producing the wet friction plate 200, the friction material 210 may be pressed after the friction material 210 on the core metal 201 is stuck on the core metal 201 by heating. The step of crushing the fine groove 211 can also be executed in this manner.

Also, in the above-described embodiment, thermosetting resin is used as an adhesive agent for fixing the friction material 210 on the core metal 201. However, naturally, an adhesive agent other than thermosetting resin may be used as the adhesive agent for fixing the friction material 210 on the core metal 201. Examples of the adhesive agent include an elastomer-based adhesive agent (such as a silicone-based or modified silicone-based adhesive agent), a thermoplastic resin-based adhesive agent (such as a polyvinyl alcohol-based, polyamide-based, or polyolefin-based adhesive agent), and an inorganic adhesive agent (a ceramic-based adhesive agent or silicate of soda).

Also, in the above-described embodiment, the laser processor 300 was configured such that the laser head 301 can be displaced in three axis directions orthogonal to one another of X-axis direction, Y-axis direction, and Z-axis direction. However, the laser processor 300 may have a different configuration as long as the fine groove 211 can be formed to the friction material 210. Therefore, for example, the laser processor 300 can be configured such that, instead of or in addition to displacing the laser head 301 and/or the work table 302, a galvanometer scanner or a polygon mirror included in the laser head 301 scans laser light L in each of X-axis direction and Y-axis direction.

Also, in the above-described embodiment, the friction material 210 is configured with a paper body. However, the friction material 210 can also be configured with a material other than a paper material, such as a rubber material or a cork material.

Also, in the above-described embodiment, an example has been described, in which the wet friction plate according to the present invention is applied to the wet friction plate 200 used in the wet multiple disc clutch device 100. However, the wet friction plate according to the present invention may be a wet friction plate used in oil. The wet friction plate according to the present invention can also be applied to, other than the wet multiple disc clutch device 100, a wet friction plate used in a braking device for putting a brake on a rotation motion by a motor.

LIST OF REFERENCE SIGNS

L: Laser light, 100: Wet multiple disc clutch device, 101: Housing, 102: Input gear, 102a: Torque damper, 102b: Rivet, 103: Clutch plate, 104: Friction plate holder, 104a: Tubular support column, 104b: Receiving part, 105: Shaft, 105a: Needle bearing, 105b: Nut, 106: Push rod, 107: Pressing cover, 107a: Release bearing, 108a: Bolt, 108b:

Receiving plate, 108c: Coil spring, 200: Wet friction plate, 201: Core metal, 202: Spline, 203: Oil groove, 210: Friction material, 211: Fine groove, 212: Intra-groove surface, 212a, 212b: Side surface, 300: Laser processor, 301: Laser head, 302: Work table, 303: Work conveying mechanism, 400: Hot press processor, 401: Lower pressing plate, 402: Upper pressing plate, 403: Movable support device, 403a: Lower base, 403b: Support column, 403c: Upper base.

The invention claimed is:

1. A method for producing a wet friction plate that includes a friction material disposed along a circumferential direction on a surface of a core metal formed in a flat-plate ring shape, the method comprising:

a friction material producing step of producing, as the friction material, a paper body that includes an aggregate of numerous fibers impregnated with thermosetting resin, the friction material producing step including curing the thermosetting resin until the thermosetting resin is not completely cured to produce the paper body containing the thermosetting resin in a semi-cured state;

a groove forming step of irradiating the friction material in which the paper body containing the thermosetting resin is in the semi-cured state with laser light that is displaced relative to the friction material, thereby to form a concave groove on a surface of the friction material; and a crushing step of pressing the friction material while heated to crush and deform the groove formed by the laser light, wherein the friction material is heated so that the thermosetting resin in the semi-cured state is completely cured, and the groove is deformed so as to create unevenness on side surfaces of the groove to increase a surface area of an inner surface of the groove as compared to a surface area of the inner surface of the groove before the crushing step.

2. The method for producing a wet friction plate according to claim 1, further comprising a friction material disposing step of disposing the friction material on the core metal, wherein the groove forming step is performed before the friction material disposing step.

3. The method for producing a wet friction plate according to claim 2, wherein the crushing step is performed to the friction material disposed on the core metal.

4. The method for producing a wet friction plate according to claim 3, wherein in the friction material disposing step, an adhesive agent is disposed between the core metal and the friction material, and in the crushing step, the friction material is pressed so that the friction material is stuck on the core metal.

5. The method for producing a wet friction plate according to claim 1, further comprising a friction material disposing step of disposing the friction material on the core metal, wherein the groove forming step is performed to the friction material disposed on the core metal, and the crushing step is performed to the friction material disposed on the core metal.

6. A method for producing a wet friction plate that includes a friction material disposed along a circumferential direction on a surface of a core metal formed in a flat-plate ring shape, the method comprising:

a friction material producing step of producing, as the friction material, a paper body impregnated with thermosetting resin, the paper body including an aggregate of numerous fibers to which a filler is added, the filler exerting a function as a friction adjuster and/or a solid lubricant, the friction material producing step including curing the thermosetting resin until the thermosetting resin is not completely cured to produce the paper body containing the thermosetting resin in a semi-cured state;

a groove forming step of irradiating the friction material in which the paper body containing the thermosetting resin is in the semi-cured state with laser light that is displaced relative to the friction material, thereby to form a concave groove on a surface of the friction material; and a crushing step of pressing the friction material while heated to crush and deform the groove formed by the laser light, wherein the friction material is heated so that the thermosetting resin in the semi-cured state is completely cured, and the groove is deformed so as to create unevenness on side surfaces of the groove to increase a surface area of an inner surface of the groove as compared to a surface area of the inner surface of the groove before the crushing step.

7. A method for producing a wet friction plate that includes a friction material disposed along a circumferential direction on a surface of a core metal formed in a flat-plate ring shape, the method comprising:

a friction material producing step of producing, as the friction material, a paper body impregnated with thermosetting resin, the paper body including an aggregate of numerous fibers to which a filler is added, the filler being one or more selected a group consisting of barium sulfate, calcium carbonate, magnesium carbonate, silicon carbide, boron carbide, titanium carbide, silicon nitride, boron nitride, alumina, silica, zirconia, cashew dust, rubber dust, diatomaceous earth, graphite, talc, kaolin, magnesium oxide, molybdenum disulfide, nitrile rubber, acrylonitrile-butadiene rubber, styrene butadiene rubber, silicon rubber and fluorine rubber, the friction material producing step including curing the thermosetting resin until the thermosetting resin is not completely cured to produce the paper body containing the thermosetting resin in a semi-cured state;

a groove forming step of irradiating the friction material in which the paper body containing the thermosetting resin is in the semi-cured state with laser light that is displaced relative to the friction material, thereby to form a concave groove on a surface of the friction material; and a crushing step of pressing the friction material while heated to crush and deform the groove formed by the laser light, wherein the friction material is heated so that the thermosetting resin in the semi-cured state is completely cured, and the groove is deformed so as to create unevenness on side surfaces of the groove to increase a surface area of an inner surface of the groove as compared to a surface area of the inner surface of the groove before the crushing step.

* * * * *